Patented Dec. 7, 1948

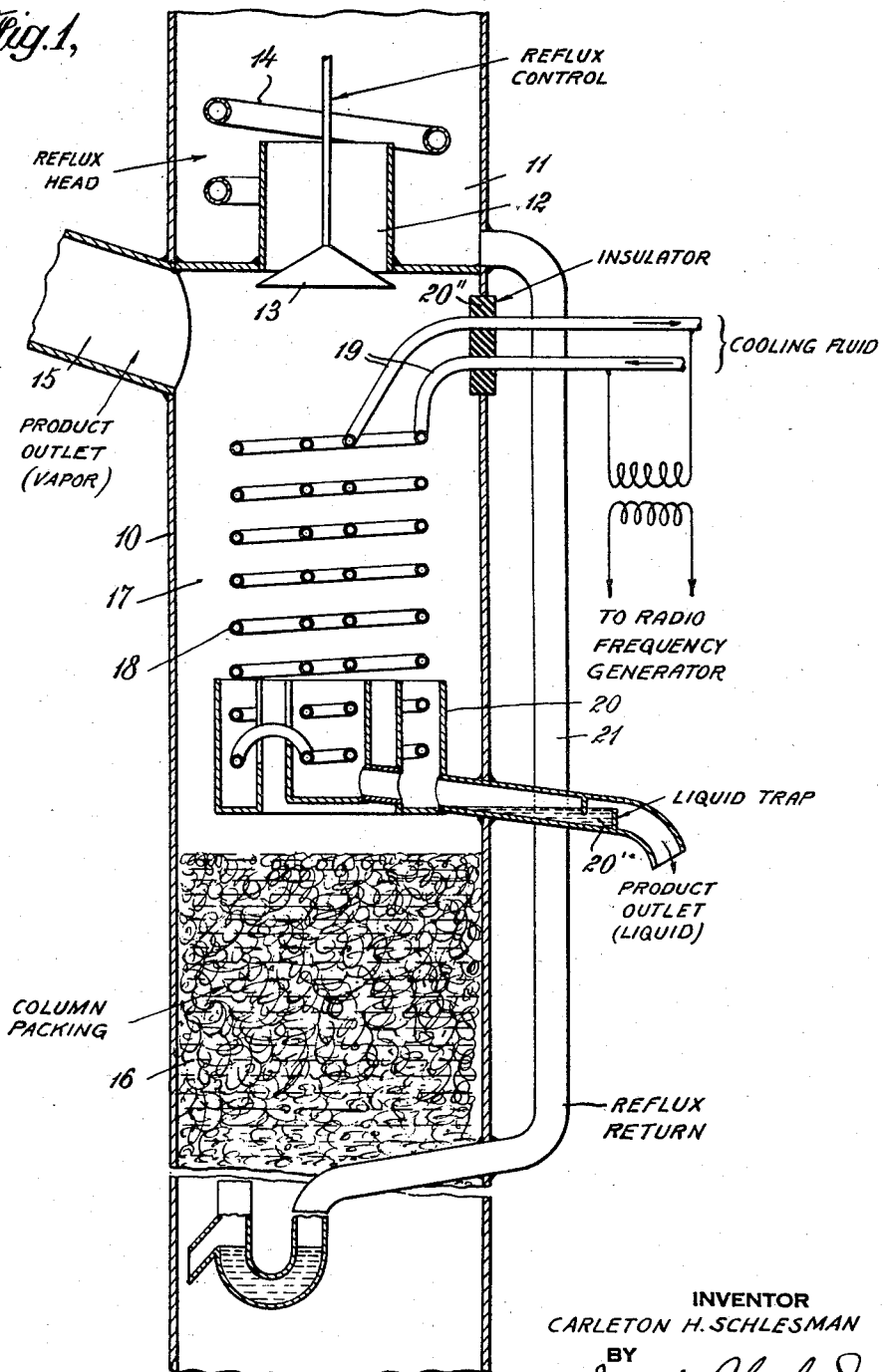

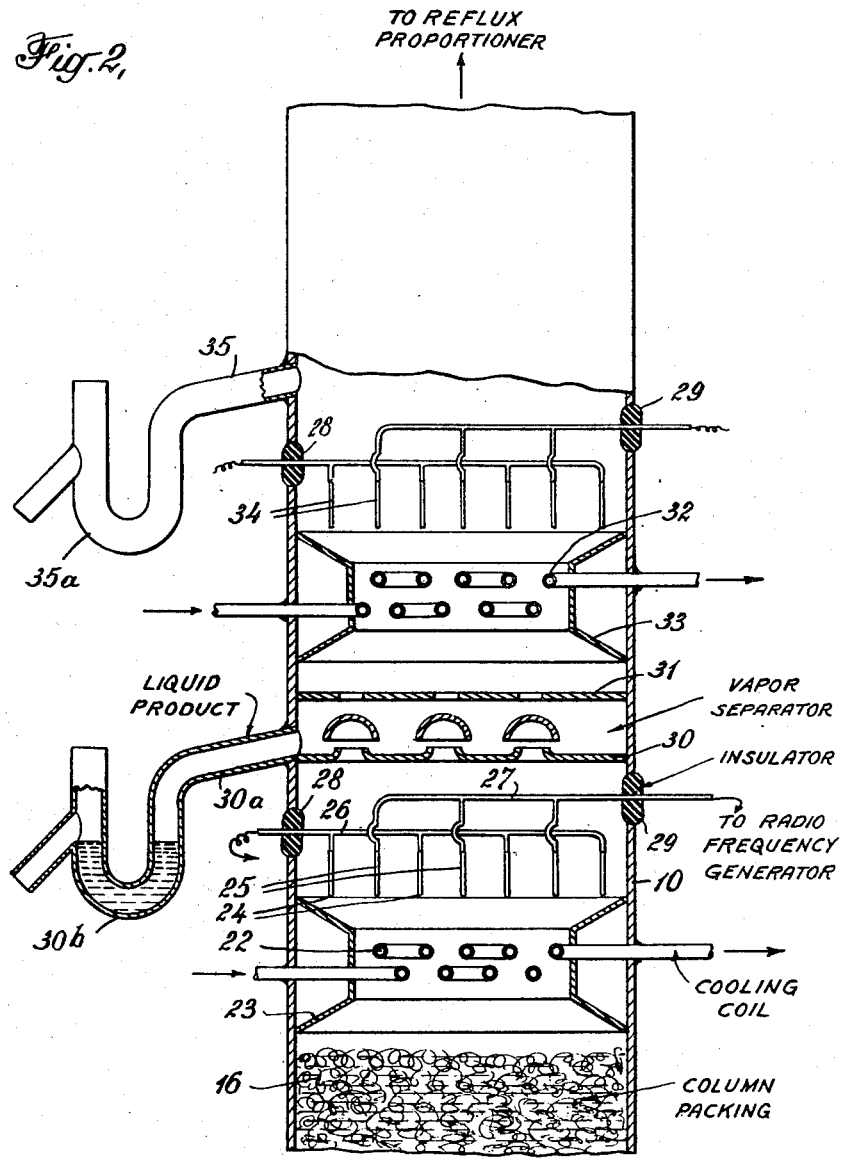

2,455,812

UNITED STATES PATENT OFFICE 2,455,812

FRACTIONATION IN PRESENCE OF RADIANT ENERGY

Carleton H. Schlesman, Camden, N. J., assignor to Socony-Vacuum Oil Company, Incorporated, a corporation of New York Application June 30, 1945, Serial No. 602,603

5 Claims. (Cl. 196—94)

1

This invention relates generally to fractional distillation and more particularly to a method and apparatus for the separation of two compounds having almost identical boiling points or compounds which form constant boiling mixtures.

This is accomplished by taking advantage of the well known principle that chemical compounds having the same vapor pressure differ in their absorption of radiant energy and utilizing radiant energy to maintain one of the compounds of a mixture in its original state while separating the other compound therefrom by changing its state, such as, for example, maintaining one compound in liquid state while converting the other from a liquid state to a vapor state; maintaining one compound in a vapor state while converting the other from a vapor state to a liquid state; or maintaining one compound in a liquid state while converting the other compound from a liquid state to a frozen solid state.

In the purification of hydrocarbons and chemical compounds efficient fractionating columns having as many as one hundred theoretical plates, have been found to be important devices for the separation of impurities or the separation of one compound from another. The use of such fractionating columns is not practical in certain cases, such as, for example, where two compounds having almost identical boiling points or in the case of compounds which form constant boiling mixtures. The present invention deals with a device which retains much of the simplicity and high capacity of the fractionating columns and which provides fractionation or separation over and above that possible by distillation alone.

Prior to this invention a mixture of compounds having almost identical boiling points or compounds which form constant boiling mixtures have posed a problem in the prior art that has been met with a degree of success by employing azeotropic distillation, solvent extraction, or chemical processes.

The azeotropic distillation process requires at least three additional steps in the fractionation if it is desired to separately recover both compounds and the azeotrope forming agent, namely, the separation of one compound as a fraction from the azeotrope formed by the fraction representing the other compound and the azeotrope forming agent; the separation of the second compound

2 from the constant boiling azeotrope by the addition of a separating agent; and then separating the azeotrope forming agent from the last mentioned separating agent. Since none of these steps can be carried out in the regular fractionating column the process necessarily involves the use of additional expensive equipment.

The solvent extraction process requires at least two additional steps that must be carried out outside the regular fractionation column, namely, introducing a solvent into the mixture which combines with one compound to separate the mixture into a fraction and a fraction plus the solvent; and then separating the solvent from the second fraction.

Chemical processes such as those carried out by introducing sulfuric acid into the mixture of two compounds having nearly the same boiling points are carried out outside the regular fractionation column and usually result in the loss of one of the compounds.

Obviously any one of the above processes involve considerable additional equipment and are very expensive.

The present invention, in comparison with the above outlined processes of the prior art, is the utmost in simplicity and provides a method of separating fractions comprising two compounds of nearly the same boiling points or constant boiling mixtures that can be, if desired, carried out right in the top of the regular fractionation column during normal fractional distillation procedure without the necessity of adding azeotrope forming agents, solvent extraction agents or chemical reaction agents, or of later recovering such added reagents.

It is known that chemical compounds having the same vapor pressure differ in their absorption of radiant energy. Conjugate double bonds cause absorption in the ultra-violet portion of the spectrum. Polar molecules such as nitro benzene, $C_6H_5NO_2$, absorb the radio frequencies. This fact is employed to effect separation. If two compounds produced at their boiling point are passed over a cooled surface and at the same time exposed to a high frequency field the compound showing absorption at that frequency will remain a vapor while the other showing no absorption will be condensed. As an example methyl ethyl ketone $CH_3COC_2H_5$ and isopropyl alcohol both having a boiling point of 81° C. can be separated by the present invention. Since the ketone shows a very strong absorption of radio frequency radiation, it can be separated as a vapor from the alcohol which is recovered as a liquid.

Additionally, 2,2,3-trimethyl butane (triptane) and 2,2-dimethyl pentane show similar boiling points, hence they are very difficult to separate by distillation. Since triptane shows a strong infrared radiation absorption in the region of 120,000 angstrom units at which point 2,2-dimethyl pentane does not absorb, infra-red radiation absorption of this frequency may be employed to effect separation.

Therefore, the primary object of this invention resides in the provision of a novel method and apparatus for separating compounds having the same boiling points or compounds which form constant boiling mixtures by subjecting them to radiant energy of a frequency selected such that one will absorb energy and the other will not.

Another object of this invention resides in the provision of a fractionation method for the separation of compounds having the same boiling points which utilizes radiant energy for controlling fractionation.

Still another object of this invention resides in the provision of apparatus which may be utilized with conventional fractionating units for the further separation of compounds by separating those having the same boiling points or which form a mixture having a constant boiling point.

This invention further contemplates a method and apparatus for separating two compounds having the same freezing point since one of them will absorb radiant energy at a given frequency and the other will not.

Still another object of this invention resides in the provision of a method for the separation of compounds having the same boiling point which can be carried out in a single step or in a series of successive steps.

Other objects and advantages of this invention will become apparent from the following description when considered with the drawings in which Figure 1 shows diagrammatically a vertical section of a fractionating column utilizing the present invention;

Figure 2 is a fragmentary vertical section, showing diagrammatically, a fractionating tower showing the manner in which the present invention can be practiced in a plurality of stages.

Referring to the drawings in detail the simplest form of the apparatus for practicing the present invention is illustrated by Figure 1 in which the casing 10 may be a part of a fractional distillation column. There is provided at the top of the casing 10 a conventional reflux head which comprises a condensing chamber 11, an inlet passageway thereto 12, a valve 13 for controlling the amount of opening into the passageway and a cooling coil 14 disposed in the chamber 11. Immediately below the reflux head there is provided a vapor product outlet passageway 15. The bottom of the chamber defined by the casing 10 carries a packing column 16 through which vapors from the fractionating column must pass before entering the zone 17 where further separation of the vapors is effected by subjecting them to radiant energy. Radiant energy is supplied by a coil 18 that is provided with leads 19 which extend through an insulating plug 20'' to a radiant energy source not shown. The coil 18 and leads 19 are formed of tubing through which a coolant is circulated to effect a condensation of vapors coming into contact with the outer surface of the coil. Directly beneath the coil 18 there is provided a tray 20 that is adapted to catch the condensate. The tray 20 is provided with a draw-off outlet which extends through the housing 10 to a point outside the housing where the condensate may be collected. This outlet is provided with a liquid trap 20' which prevents vapors from escaping.

In operation vapor consisting of two components passes upwardly from the fractionating column through the packing column 16 into the zone 17 in which there is disposed a multiturn solenoid 18 made of copper tubing. Water or other temperature control medium is passed through this coil, and the two components having similar boiling points are passed over the coil in the form of a vapor at a temperature at which the liquid and gas phases are in equilibrium. For example, for water at 760 mm. pressure, this is 100° C., the one component reaching the coil which is slightly cooler than the vapor, condenses. The other component receives sufficient energy from the radiation field to keep it in vapor form and to superheat the vapor slightly. This component passes out of the housing in the form of vapor.

To insure complete separation of the components any part or all of the component remaining in vapor form may be admitted to the reflux head and after condensation returned for recycling by the conduit 21.

In Figure 2 there is illustrated a modified form of apparatus which illustrates the use of successive stages for effecting a greater separation of compounds having nearly the same boiling points or a constant boiling mixture. In this form of the apparatus there is located above the packing column 16, in the bottom of the casing 10, a cooling coil 22. The cooling coil, as shown, may be provided with directing plates 23 which direct all of the vapors coming through the packing column 16 over the cooling coil 22. Located directly above the cooling coil 22 are two sets of electrodes 24 and 25. These electrodes are carried by conductors 26 and 27, respectively, which extend through bushings 28 and 29 in the housing 10 to a radiant energy source, not shown, located outside of the housing 10. A bubble plate 30 is disposed directly above the electrodes 24 and 25 and in the path of the vapors in their upward movement. The bubble plate 30 is provided with a liquid product outlet 30a. Outlet 30a has a liquid trap 30b which prevents the vapors from escaping.

Above the bubble plate 30 there are provided baffles 31 which tend to retard the flow of vapors from the zone above the bubble plate 30 to a next cooling zone in which there is disposed a cooling coil 32 and directing plates 33. The cooling coil 32 is a part of a second stage identical to that just described.

As an example of the operation of this form of the invention water and ethyl alcohol form a constant boiling mixture so that it is not possible to concentrate alcohol by ordinary fractional distillation methods beyond 95% purity. It is well known, however, that water being a polar molecule has strong absorption in the radio frequency spectrum in the high frequency region between 1 and 5 centimeters wave length. Alcohol does not show equal absorption at points within this region. In fact, important differences in power absorption of these materials is already in evidence at 6 megacycles frequency. In order to carry out further separation of these two compounds the mixture is vaporized in an ordinary fractionating column and the vapor passed through bubble plates to effect preliminary fractionation. At the top of the column the conventional reflux device is provided as in ordinary operation, the column being operated at 100% reflux. When the super fractionating device is in operation an auxiliary vapor outlet is provided in the fractionating column slightly below the reflux head. The vapor passes through a cooling zone where its temperature is dropped rapidly for a few degrees so that the vapors are supercooled. Because of the high velocity of the vapors condensation has not yet taken place. In a narrow zone immediately above the supercooler 22, the vapors are subjected to an intense radio or electromagnetic field of sufficient wave length that strong absorption is caused in the vapor of one component only, for example, the water. The means for providing this field is shown in the drawings as electrodes 24 and 25. As a result of the absorption of energy from the radiation field the free path of the water molecules is greatly increased such that the effective vapor pressure is greater than the supercooled alcohol molecules. The vapors next impinge against a detraining device or partial condenser which may be, as illustrated, a bubble plate. Fine mesh screens or electrically charged plates such as a Cottrel precipitator can also be used. In this zone the liquified alcohol molecules are withdrawn through the outlet 30a and trap 30b while the water molecules because of their great energy content pass out as vapor through the openings in the baffle plate 31. The vapors rising through the openings 31 come into contact with the cooling coil 32 of the second stage where they are again supercooled and subjected to an intense radio or electro-magnetic field which is supplied by the electrodes 34 of the second stage. These vapors next impinge against a second detraining device where any alcohol remaining in the vapors, after they have passed through the first stage, is removed and drawn off through the outlet 35 and trap 35a in liquid form.

It will be appreciated that a similar separation may be effected between hydrocarbons of identical boiling points if they differ in energy absorption in radiation fields and that multiple stages of more than two may be employed to effect still further concentration.

While the invention comprises three steps; supercooling, radiation and condensation of vapor, the use of the radiation step alone will effect improvement in separation over that ordinarily obtained by fractionation.

This invention is not limited to radio frequencies but may also be applied to infra-red visible and ultra-violet radiation. For example, the two hydrocarbons given in an example above 2,2,3-trimethyl butane (triptane) and 2,2-dimethyl pentane have similar boiling points. Since triptane shows a strong infra-red radiation absorption in the region of 120,000 angstrom units at which point 2,2-dimethyl pentane does not absorb, infra-red radiation absorption of this frequency may be employed to effect separation. In this case the triptane passes out as a vapor while the other component returns in the liquid state.

It will be appreciated that with slight modification, this method may be applied to any other separations involving a change of phase, for example, the freezing of one component while the other component remains liquid will also permit separation of two materials of the same freezing point provided that the components differ in their absorption of radiation.

I claim:

1. A process for the separation of a continuous fluid system consisting predominantly of components undergoing a change in phase at substantially the same temperature but having different capacities to absorb radiant energy of a predetermined nature into separate phases each relatively rich in one of said components, which comprises adjusting the temperature of said fluid system to a point of incipient phase change, causing phase change in said system while subjecting the system to radiation of said predetermined nature, whereby phase change of one component is induced while phase change of another component is suppressed, and separating phases relatively rich in different components.

2. A method of effecting a further separation of petroleum fractions which consists of a mixture of compounds that have substantially identical boiling points, that comprises the steps of subjecting the fraction while in vapor state to radiations from a selected portion of the radio frequency spectrum, said portion being so selected that at least one of the compounds in the fraction will absorb radiant energy and at least one other will not, simultaneously subjecting the fraction to a cooling medium whereby the compound that absorbs radiant energy will remain in a vapor state while the compound that does not absorb radiant energy at the selected frequencies will be condensed, thereby separating the compounds of the fraction.

3. A method of separating the components of a mixture, at least two of said components having substantially identical boiling points, that comprises the steps of separating the mixture into fractions by fractional distillation, separating the components contained in a fraction which have substantially identical boiling points by vaporizing the fraction, subjecting the vaporized fraction to radiant energy of such frequency that one component will absorb energy and the other will not, simultaneously subjecting the fraction to a cooling medium, whereby the component absorbing radiant energy will retain its physical state and the one which does not absorb radiant energy at that frequency will change state, and separating the two components in accordance with their physical states.

4. A method of separating a mixture of two compounds, existing in vapor state, that have substantially identical condensing points, that comprises bringing the mixture almost to the condensing point, subjecting the mixture to radiant energy of selected frequency at which one compound is capable of absorbing energy and the other is not, simultaneously subjecting the mixture to a cooling medium whereby the compound which absorbs radiant energy at that frequency will remain in vapor state and the other will be condensed, and separating the condensed component from those in vapor state.

5. A method of selectively changing the state of the components of a mixture of components which customarily undergo a change in phase at substantially the same temperature but having different capacities to absorb radiant energy of a predetermined nature that comprises subjecting the mixture to radiant energy of a frequency so selected that at least one of the components will absorb energy and thereby remain in its original state and at least one other will not, simultaneously subjecting the mixture to a heat exchanger to effect a cooling of a component which did not absorb energy at the selected frequency to thereby change its state, whereby the physical state of at least one component will become different from at least one other component, and separating the components existing in changed state from the mixture.

CARLETON H. SCHLESMAN.

REFERENCES CITED

The following references are of record in the file of this patent:

UNITED STATES PATENTS

| Number | Name | Date |
|---|---|---|
| 1,419,008 | Baum | June 6, 1922 |
| 1,768,179 | Welch | June 24, 1930 |
| 1,881,041 | Benjamin | Oct. 4, 1932 |
| 2,153,599 | Thomas | Apr. 11, 1939 |
| 2,209,798 | Subkow | July 30, 1940 |
| 2,224,621 | Voorhees | Dec. 10, 1940 |
| 2,265,762 | McKittrick et al. | Dec. 9, 1941 |
| 2,343,666 | Hickman | Mar. 7, 1944 |
| 2,362,889 | Darrah | Nov. 14, 1944 |

FOREIGN PATENTS

| Number | Country | Date |
|---|---|---|
| 417,501 | Great Britain | Sept. 28, 1934 |
| 517,006 | France | Apr. 29, 1921 |
| 690,342 | France | Sept. 18, 1930 |